US011112183B2

(12) United States Patent
Turney et al.

(10) Patent No.: US 11,112,183 B2
(45) Date of Patent: Sep. 7, 2021

(54) HEAT EXCHANGER CHANNELS

(71) Applicant: Hamilton Sundstrand Corporation, Charlotte, NC (US)

(72) Inventors: Joseph Turney, Amston, CT (US); Ram Ranjan, West Hartford, CT (US); Thomas M. Yun, Glastonbury, CT (US); Matthew R. Pearson, Hartford, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 409 days.

(21) Appl. No.: 14/995,957

(22) Filed: Jan. 14, 2016

(65) Prior Publication Data
US 2017/0205146 A1 Jul. 20, 2017

(51) Int. Cl.
*F28D 7/00* (2006.01)
*F28D 7/08* (2006.01)
*F28F 1/08* (2006.01)
*F28F 7/02* (2006.01)
*F28D 7/02* (2006.01)
*B23P 15/26* (2006.01)
*F28F 1/02* (2006.01)
(Continued)

(52) U.S. Cl.
CPC .............. *F28D 7/022* (2013.01); *B23P 15/26* (2013.01); *F28D 7/0033* (2013.01); *F28F 1/025* (2013.01); *F28F 1/04* (2013.01); *F28F 7/02* (2013.01); *F28D 7/082* (2013.01); *F28F 1/08* (2013.01); *F28F 13/08* (2013.01); *F28F 2210/08* (2013.01)

(58) Field of Classification Search
CPC ...... F28D 7/0016; F28D 7/082; F28D 7/0033; F28F 7/02; F28F 1/08
USPC ........................................................ 165/165
See application file for complete search history.

(56) References Cited

U.S. PATENT DOCUMENTS 2,166,375 A * 7/1939 Schwarze ................. C21B 9/06
165/109.1
2,906,508 A 9/1959 Getz
(Continued)

FOREIGN PATENT DOCUMENTS

DE 1240897 B 5/1967
EP 2706318 B1 * 3/2016 ........... F28D 7/1607
(Continued)

OTHER PUBLICATIONS

Searched Compartment pressurization Air Cycle—Heat Transfer « This is ECS—Blog, http://thisisecs.com/blog/2008/11/04/heat-transfer/ accessed Jan. 13, 2016.
(Continued)

*Primary Examiner* — Leonard R Leo
(74) *Attorney, Agent, or Firm* — Locke Lord LLP; Joshua L. Jones; Scott D. Wofsy

(57) ABSTRACT

A heat exchanger includes a heat exchanger body having a first end and a second end opposed to the first end along a flow axis. A plurality of flow channels is defined in the heat exchanger body extending axially with respect to the flow axis. A first set of the flow channels forms a first flow circuit and a second set of the flow channels forms a second flow circuit that is in fluid isolation from the first flow circuit. Each flow channel is fluidly isolated from the other flow channels. The flow channels all conform to a curvilinear profile.

9 Claims, 4 Drawing Sheets

(51) Int. Cl.
*F28F 1/04* (2006.01)
*F28F 13/08* (2006.01)

(56) References Cited

U.S. PATENT DOCUMENTS

| | | | |
|---|---|---|---|
| 3,693,711 | A | 9/1972 | Zygiel |
| 4,919,200 | A | 4/1990 | Glomski et al. |
| 5,167,879 | A | 12/1992 | Streng |
| 7,285,153 | B2 * | 10/2007 | Bruun .............. F23C 13/00 165/165 |
| 8,272,430 | B2 * | 9/2012 | Yamada .............. F28D 9/005 165/109.1 |
| 2003/0178188 | A1 * | 9/2003 | Coleman .............. F28D 7/0033 165/164 |
| 2005/0217837 | A1 * | 10/2005 | Kudija, Jr. .............. F28D 7/0008 165/165 |
| 2006/0289152 | A1 | 12/2006 | Leuschner et al. |
| 2010/0243220 | A1 | 9/2010 | Geskes et al. |
| 2010/0314088 | A1 | 12/2010 | Yoo et al. |
| 2012/0111548 | A1 * | 5/2012 | Toparkus .............. F28F 1/02 165/177 |
| 2015/0316326 | A1 | 11/2015 | Choi |

FOREIGN PATENT DOCUMENTS

| | | |
|---|---|---|
| FR | 1421491 A | 12/1965 |
| JP | 2005351488 A | 12/2005 |
| WO | WO-2012010620 A1 | 1/2012 |

OTHER PUBLICATIONS

Extended European Search Report, of the European Patent Office, dated Jun. 6, 2017, in corresponding European Patent Application No. 17151354.2.

European Communication Pursuant to Article 94(3) EPC dated Apr. 30, 2018, issued during the prosecution of corresponding European Patent Application No. EP 17151354.2.

European Communication Pursuant to Article 94(3) EPC, dated Nov. 23, 2018, issued during the prosecution of European Patent Application No. EP 17151354.2 (5 pages).

* cited by examiner

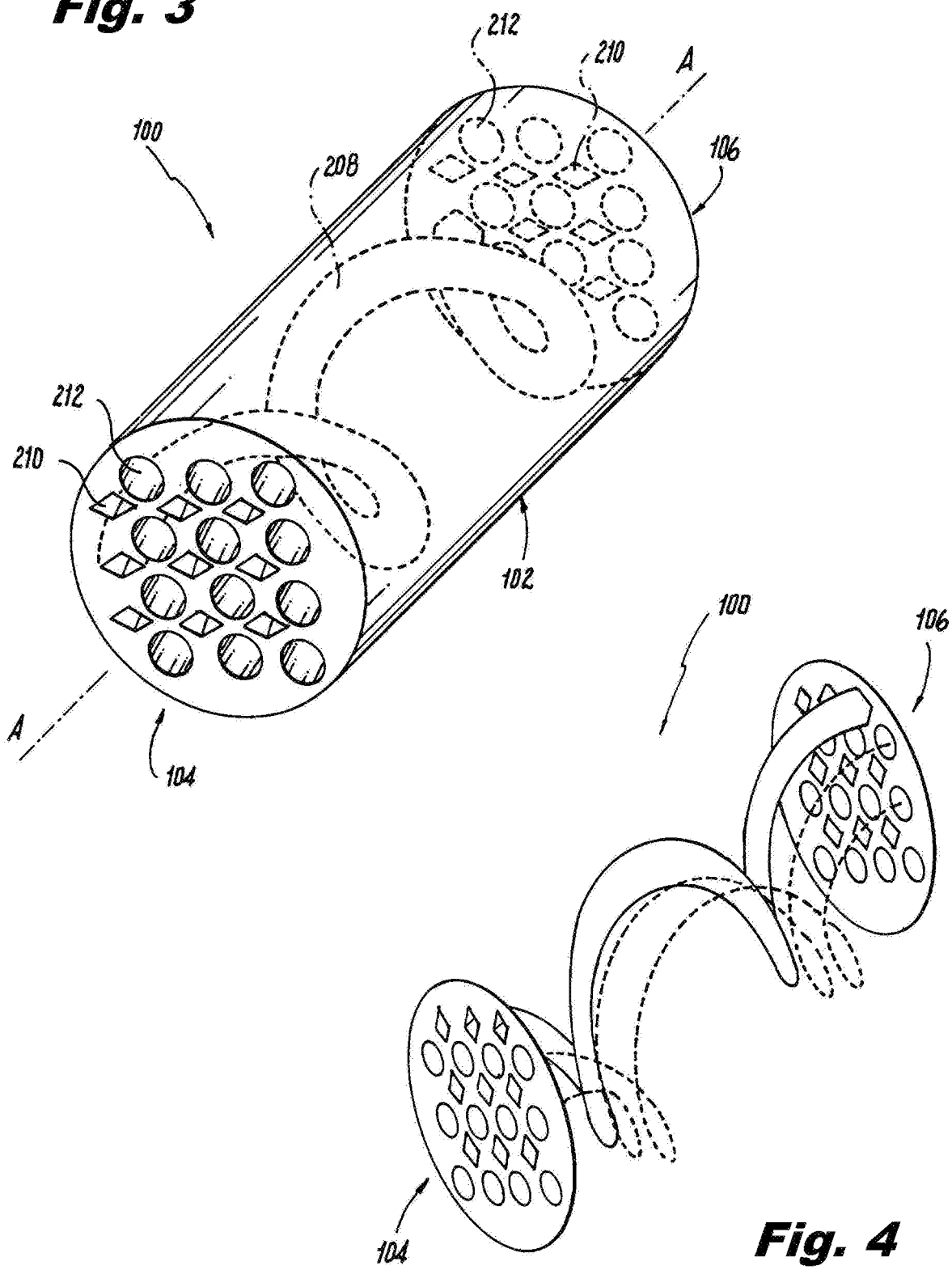

HEAT EXCHANGER CHANNELS

BACKGROUND OF THE INVENTION

1. Field of the Invention

The present disclosure relates to heat exchangers, and more particularly to channels for heat exchangers.

2. Description of Related Art

Heat exchangers are central to the functionality of numerous systems, such as in gas turbine engines and environmental systems. On gas turbine engines, for example, heat exchangers are used for a variety of oil and air cooling applications. Heat exchangers are central to the operation of environmental control systems, e.g. air cycles, as well as other cooling systems. All of these applications are under continual design pressure to increase heat transfer performance, reductions in pressure loss, and reductions in size and weight. Conventional heat exchanger designs are dominated by plate fin construction, with tube shell and plate-type heat exchangers having niche applications. Traditional plate fin construction imposes multiple design constraints that can inhibit performance and increase size and weight. Without such design constraints, traditional heat exchangers could suffer structural reliability issues. Eventually, conventional designs will be unable to meet ever increasing high temperature applications, and this can limit system integration.

Such conventional methods and systems have generally been considered satisfactory for their intended purpose. However, there is still a need in the art for improved heat exchangers. The present disclosure provides a solution for this need.

SUMMARY OF THE INVENTION

A heat exchanger includes a heat exchanger body having a first end and a second end opposed to the first end along a flow axis. A plurality of flow channels is defined in the heat exchanger body extending axially with respect to the flow axis. A first set of the flow channels forms a first flow circuit and a second set of the flow channels forms a second flow circuit that is in fluid isolation from the first flow circuit. Each flow channel is fluidly isolated from the other flow channels. Each flow channel of the first flow circuit includes a respective inlet on the first end of the heat exchanger body and a respective outlet on the second end of the heat exchanger body. Each flow channel of the second flow circuit includes a respective inlet on one of the first and second ends of the heat exchanger body and a respective outlet on the other of the first and second ends of the heat exchanger body. The flow channels all conform to a curvilinear profile, e.g. a common curvilinear profile.

Each flow channel of the second flow circuit can include a respective inlet on the second end of the heat exchanger body and a respective outlet on the first end of the heat exchanger body. Each flow channel can include a single respective inlet and a single respective outlet. The flow channels of the first flow circuit can have cross-sections of a first shape, and wherein the flow channels of the second flow circuit can have cross-sections of a second shape different from the first shape. For example, each flow channel of the first flow circuit can have a diamond or hexagonal cross-sectional shape, and each flow channel of the second flow circuit can have a circular cross-sectional shape.

Each adjacent pair of the flow channels can be separated from one another by a heat exchanger wall, e.g., wherein the heat exchanger wall is constant in cross-section from the first end of the heat exchanger body to the second end of the heat exchanger body. It is also contemplated that cross-sectional area and/or shape of the flow channels and/or heat exchanger wall can vary along the flow path. The flow channels of the first flow circuit and the flow channels of the second flow circuit can be arranged to define a two-dimensional cross-sectional checkerboard pattern with one another. The flow channels and heat exchanger body can be additively manufactured as a unitary structure.

The curvilinear profile can include a sinusoidal wave pattern extending axially relative to the flow axis. The sinusoidal wave pattern can include waves extending along a common plane. It is also contemplated that in certain embodiments, the curvilinear profile includes the sinusoidal wave pattern with waves of a first amplitude and wavelength configuration extending in a first direction normal to the flow axis, and waves of a second amplitude and wavelength configuration extending in a second direction normal do the flow axis.

It is also contemplated that the curvilinear profile can include a helical spiral. The flow passages can define a constant cross-section that is rotated about its own center over an axial extent along the flow axis.

It is also contemplated that the curvilinear profile can include a coil, wherein the flow passages define a constant cross-section that spirals around and is in plane with a longitudinal axis defined by the coil. The flow passages can coil around a central cylindrical void.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein:

FIG. 3 is a perspective view of the heat exchanger of FIG. 1, showing another exemplary embodiment of the flow channels, wherein the flow channels all conform to a helical spiral profile;

FIG. 4 is a schematic perspective view of the heat exchanger of FIG. 3, showing the inlets and outlets of the flow channels, and schematically indicating the flow channels.

DETAILED DESCRIPTION OF THE PREFERRED EMBODIMENTS

Figure 1:
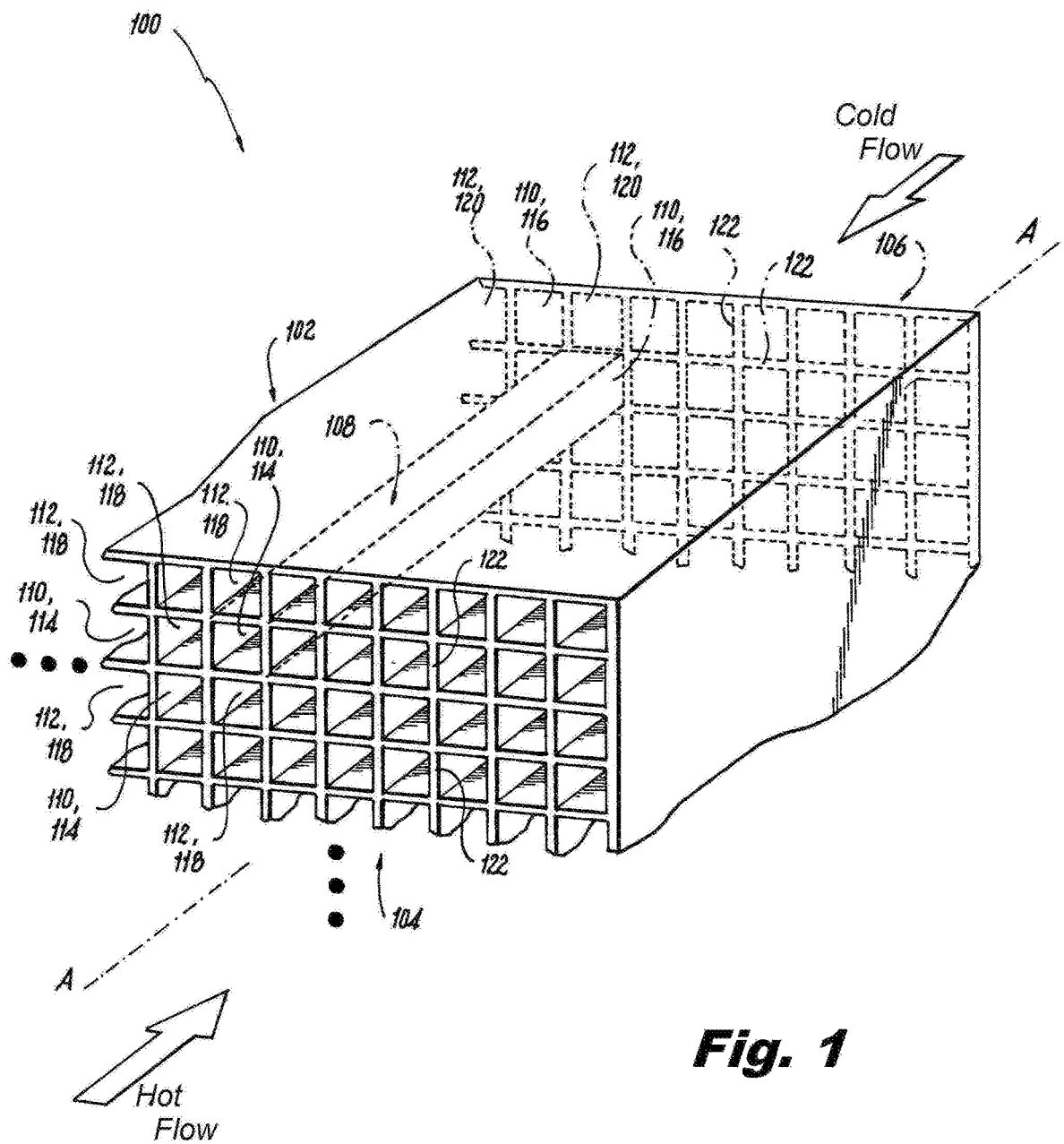
FIG. 1 is a schematic perspective view of an exemplary embodiment of a heat exchanger constructed in accordance with the present disclosure, showing the flow channels at one end of the heat exchanger, and showing one of the flow channels extending to the opposite end of the heat exchanger in broken lines.

Reference will now be made to the drawings wherein like reference numerals identify similar structural features or aspects of the subject disclosure. For purposes of explanation and illustration, and not limitation, a partial view of an exemplary embodiment of a heat exchanger in accordance with the disclosure is shown in FIG. 1 and is designated generally by reference character 100. Other embodiments of heat exchangers in accordance with the disclosure, or aspects thereof, are provided in FIGS. 2-5, as will be described. The systems and methods described herein can be used to improve heat exchanger performance and provide increased design flexibility relative to traditional heat exchangers.

Heat exchanger 100 includes a heat exchanger body 102 having a first end 104 and a second end 106 opposed to the first end 104 along a flow axis A. A plurality of flow channels 108 is defined in the heat exchanger body 102 extending axially with respect to the flow axis A. For sake of clarity, only one flow channel is indicated in broken lines in FIG. 1.

A first set of the flow channels 108 forms a first flow circuit 110 and a second set of the flow channels 108 forms a second flow circuit 112 that is in fluid isolation from the first flow circuit 110. Each flow channel 108 is fluidly isolated from the other flow channels 108. Each flow channel of the first flow circuit includes a respective inlet 114 on the first end 104 of the heat exchanger body 102 and a respective outlet 116 on the second end 106 of the heat exchanger body 102. Each flow channel 108 of the second flow circuit 112 includes a respective outlet 118 on the first end 104 of the heat exchanger body 102 and a respective inlet 120 on the second end 106 of the heat exchanger body 102.

As shown in FIG. 1, every other flow channel 108 belongs to the first flow circuit 110, and the remaining flow channels 108 belong to the second flow circuit 112. The flow channels 108 of the first and second flow circuits 110 and 112 alternate in a two-dimensional array, e.g., in a checkerboard pattern. For example, first flow circuit 110 can be the hot flow circuit, in which the flow direction along axis A is indicated by the hot flow arrow in FIG. 1, and the second flow circuit 112 can be the cold circuit, in which the flow direction along the axis A is indicated by the cold flow arrow in FIG. 1. The hot and cold flow circuits 110 and 112 exchange heat with one another within heat exchanger 100.

Each flow channel 108 of the first flow circuit 110 includes a single respective inlet 114 on the first end 104 of the heat exchanger body 102 and a single respective outlet 116 on the second end 106 of the heat exchanger body. Each flow channel 108 of the second flow circuit 112 includes a single respective inlet 120 the second end 106 of the heat exchanger body 102 and a single respective outlet 118 on the first end 104 of the heat exchanger body 120 (for sake of clarity, not all of the inlets or outlets are labeled in FIG. 1). This arrangement provides a counter-flow heat exchanger configuration. In FIG. 1, the flow channels 108 are indicated schematically as being straight or linear, however as described further herein with reference to FIGS. 2-5, the flow channels 108 all conform to a curvilinear profile, e.g., a common curvilinear profile.

Each adjacent pair of the flow channels 108 is separated from one another by a heat exchanger wall 122, wherein the heat exchanger wall 122 is constant in cross-section from the first end 104 of the heat exchanger body 102 to the second end 106. The flow channels 108 and heat exchanger body 102, including walls 122 defining the flow channels 108, can be additively manufactured as a unitary structure. Those skilled in the art will readily appreciate that while the cross-section of the hot and cold flow channels 108 described herein are maintained uniform in area along the flow axis A, the cross-sections can be configured to vary along the flow path A thereby potentially resulting in varying area along the flow axis as needed on an application by application basis without departing from the scope of this disclosure. The cross sectional area of the wall 122, and the cross-sectional area and/or shape of the flow channels, can be constant or can vary between the first end and the second end. This feature, e.g., made possible by additive manufacturing, can allow localized strengthening in certain areas of heat exchangers as needed on an application specific basis.

Figure 2:
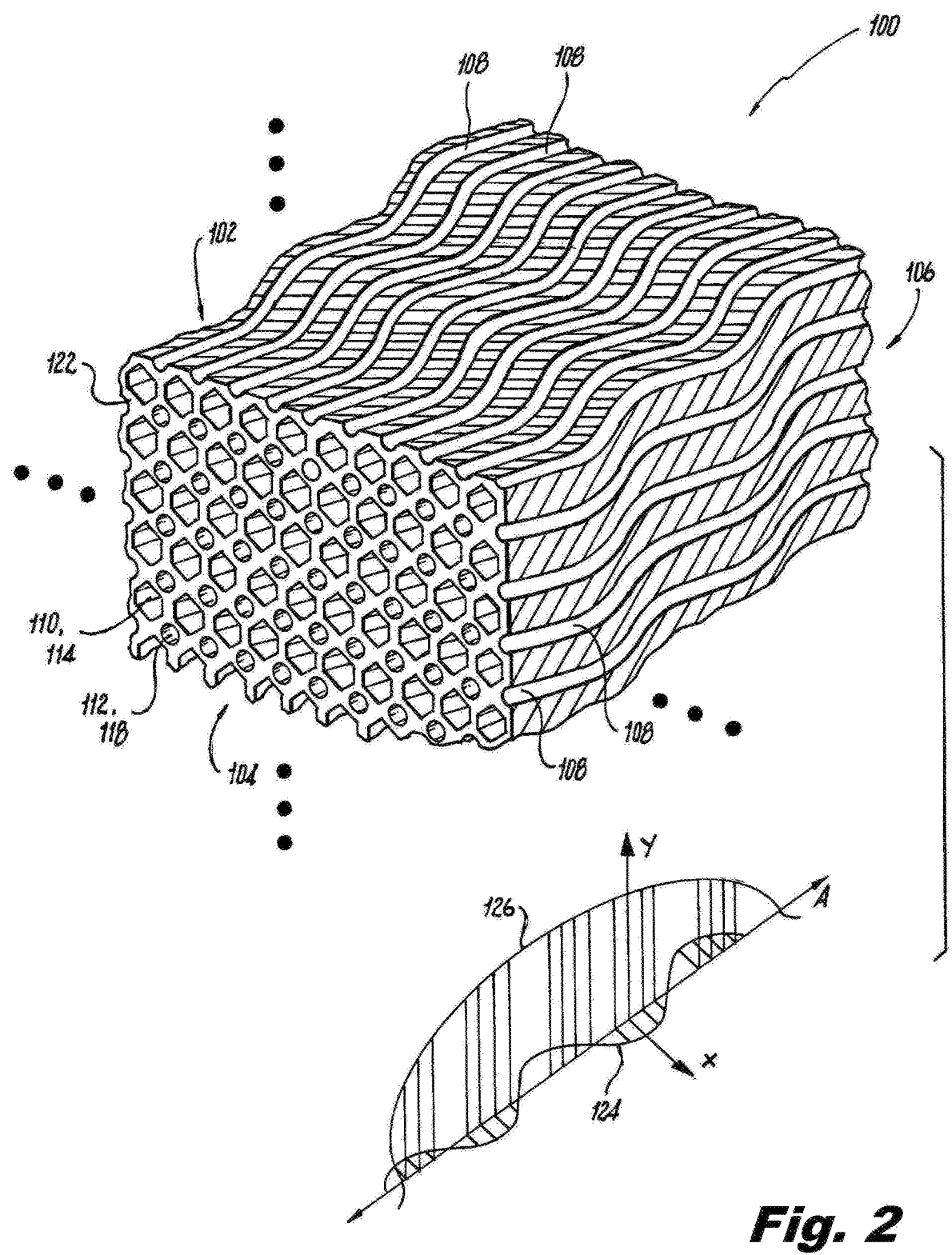
FIG. 2 is a perspective view of the heat exchanger of FIG. 1, showing one exemplary embodiment of the flow channels, wherein the flow channels all conform to a wave profile.

With reference now to FIG. 2, the curvilinear profile is indicated schematically with reference character 124, and as shown in FIG. 2, all of the flow channels 108 conform to curvilinear profile 124. Curvilinear profile 124 includes a sinusoidal wave pattern extending axially relative to the flow axis A. The sinusoidal wave pattern includes waves extending along a common plane, i.e., the plane defined by axis A and axis x indicated schematically in FIG. 2. Those skilled in the art will readily appreciate that while the curvilinear profile 124 includes the sinusoidal wave pattern with waves of a first amplitude and wavelength configuration extending only in a first direction (i.e., along the axis x) normal to the flow axis A, the profile 124 can optionally also include waves of a second amplitude and wavelength configuration extending in a second direction (e.g., along axis y) normal do the flow axis A as indicated by arc 126 in FIG. 2. Thus a compound profile is possible with waves potentially of different or the same wavelength extending in different directions. Those skilled in the art will readily appreciate that sinusoidal waves are provided by way of example, and that any other suitable type of wave or other suitable curvilinear profile can be used without departing from the scope of this disclosure. A wavy flow channel 108, as shown in FIG. 2, can be thought of as an extrusion of the flow cross-sections, e.g., the pattern of the face at first end 104 of heat exchanger body 102, along a sinusoidal, triangular, or otherwise curvilinear wave path. It should be noted that it is contemplated that curvilinear profiles as disclosed herein can include profiles with straight sections such as triangular wave patterns, square wave patterns, and the like.

The flow channels 108 of the first flow circuit 110 have cross-sections of a first shape, e.g. hexagonal, and the flow channels 108 of the second flow circuit 112 have cross-sections of a second shape different from the first shape, e.g., circular. The cross-sections of the flow passages 108 of the first and second flow circuits 110 and 112 also have different sizes from one another. Those skilled in the art will readily appreciate that the any suitable cross-sectional shapes and areas can be used, including configurations where both circuits have the same cross-sectional shape and size, as needed on an application by application basis without departing from the scope of this disclosure.

With reference now to FIG. 3, heat exchanger 100 is shown with another exemplary embodiment of flow channels 208, wherein the curvilinear profile includes a helical spiral. The flow passages 208, only one of which is depicted schematically in FIG. 3 for sake of clarity, define a constant cross-section, e.g., the cross-section at first end 104 of heat exchanger body 102, that is rotated about its own center over an axial extent along the flow axis A. Such a configuration allows the flow channels 208 to have a length longer than the actual length of the heat exchanger body 102, wherein the tighter is the spiral angle, the longer the channel length is for a given heat exchanger body length. The tradeoff in increasing the spiral angle is pressure drop, and thus a suitable spiral angle can be selected for a given application. In this example, the flow passages 208 of first flow circuit 210 have diamond shaped cross-sections, and the flow channels 208 of second flow circuit 212 have circular cross-sections. FIG. 4 schematically indicates one flow channel 208 in solid form, and indicates some of the other flow channels 208 as respective broken lines, with the cross-section of heat exchanger body 102 shown at first end 104 and second end 106.

Figure 5:
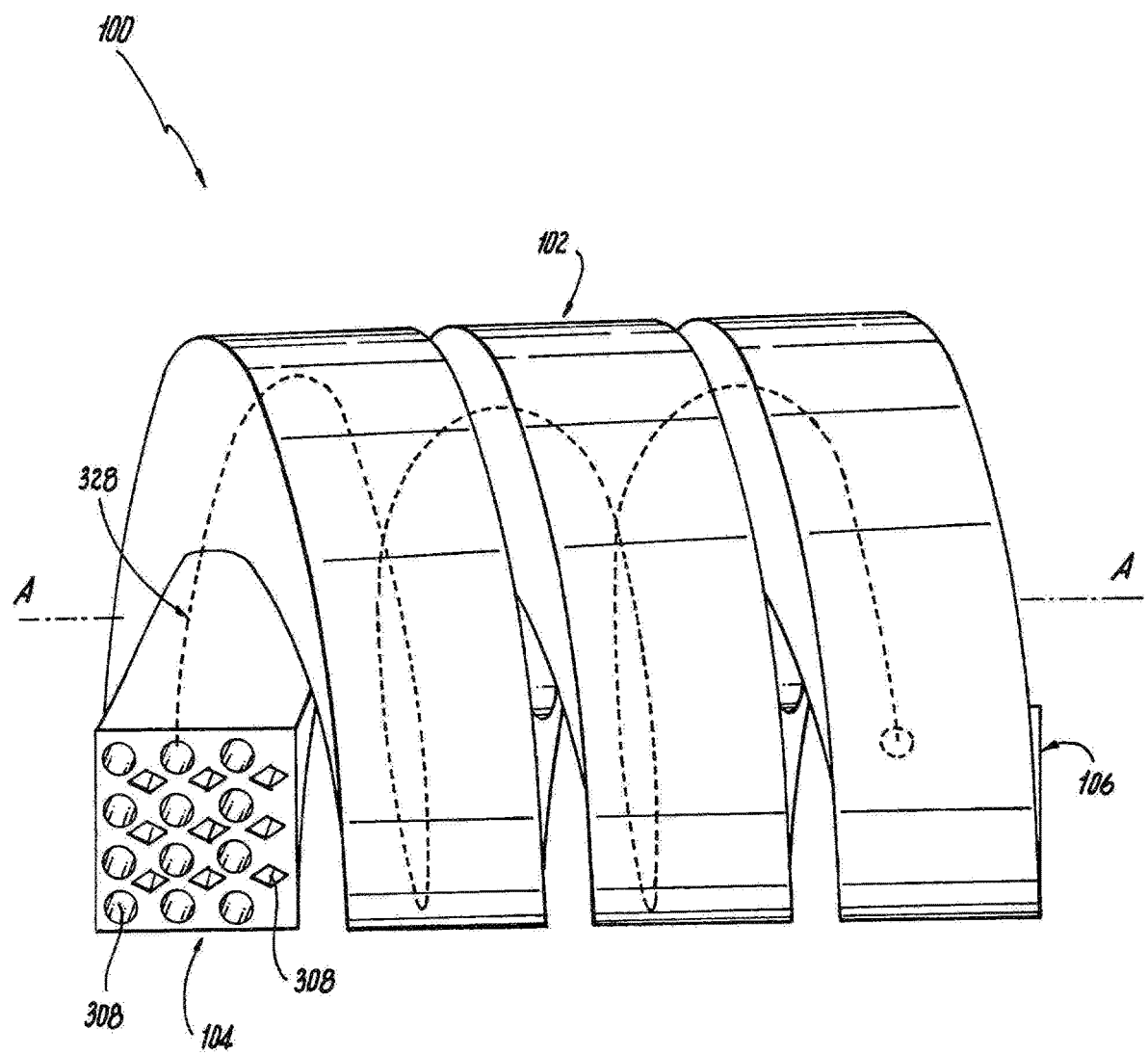
FIG. 5 is a perspective view of the heat exchanger of FIG. 1, showing another exemplary embodiment of the flow channels, wherein the flow channels all conform to a coil profile with a cylindrical void along the center of the coil.

With reference now to FIG. 5, another exemplary embodiment of heat exchanger 100 is shown in which the curvilinear profile includes a coil. The flow passages 308, only one of which is shown in broken lines in FIG. 5 for sake of clarity, define a constant cross-section, e.g., the cross section of heat exchanger body 102 at first end 104, which spirals around and is in plane with a longitudinal axis defined by the coil. The longitudinal axis of the coil follows the overall flow axis A. The flow passages 108 and heat exchanger body 102 coil around a central cylindrical void 328. The void 328 can allow the coil to wrap around a duct or shaft, for example. It should be noted that one difference between the configuration shown in FIG. 3 and that shown in FIG. 5 is that the cross-section locally perpendicular to the flow paths in FIG. 3 is always perpendicular to and intersecting the overall flow axis A, whereas in FIG. 5, the cross-section locally perpendicular to the flow paths is offset from and is always in plane with the overall flow axis A.

Potential benefits of the configurations disclosed herein include they can reduce heat exchanger size and improve performance through two principles. First, in a counter-flow configuration, improved performance is possible by enabling better balancing of the hot and cold side heat transfer and pressure drop, and also increase are possible in the heat exchanger effectiveness for a given overall heat transfer area (UA). Second, configurations disclosed herein can significantly increase the primary surface area in the heat exchanger which reduces the effects of fin efficiency, relative to traditional configurations.

Additional potential benefits of wavy or spiral flow channels in counter-flow heat exchangers relative to traditional configurations are enhancement of heat transfer by breaking thermal boundary layer and adding heat transfer area, efficient use of space by changing the aspect ratio, and adding structural flexibility to the heat exchanger design. These potential advantages contribute to further enhance the performance of baseline straight channel heat exchangers with reduced heat exchanger size. The flow channel configurations disclosed herein provide design flexibility such that heat exchangers can be created in various shapes to maximize space utilization while achieving required heat exchanger performance, such as pressure drop or heat transfer.

The methods and systems of the present disclosure, as described above and shown in the drawings, provide for heat exchangers with superior properties including greater design flexibility and improved performance relative to traditional heat exchangers. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A heat exchanger comprising:
a heat exchanger body having a first end and a second end opposed to the first end along a flow axis;
a plurality of flow channels defined in the heat exchanger body extending axially with respect to the flow axis, wherein a first set of the flow channels forms a first flow circuit, wherein a second set of the flow channels forms a second flow circuit that is in fluid isolation from the first flow circuit,
wherein each flow channel is fluidly isolated from the other flow channels, wherein each flow channel of the first flow circuit includes a respective inlet on the first end of the heat exchanger body and a respective outlet on the second end of the heat exchanger body, and wherein each flow channel of the second flow circuit includes a respective inlet on one of the first and second ends of the heat exchanger body and a respective outlet on the other of the first and second ends of the heat exchanger body, and
wherein the flow channels all conform to a curvilinear profile, wherein the curvilinear profile includes a sinusoidal wave pattern extending axially relative to the flow axis, wherein the curvilinear profile is a common curvilinear profile for the flow channels and includes the sinusoidal wave pattern with waves of a first amplitude and wavelength configuration extending in a first direction normal to the flow axis, and waves of a second amplitude and wavelength configuration extending in a second direction normal to the flow axis, wherein the first direction and second direction are different from one another, and wherein the first wavelength and the second wavelength are different from one another.

2. The heat exchanger as recited in claim 1, wherein each flow channel of the first flow circuit includes a respective inlet on the first end of the heat exchanger body and a respective outlet on the second end of the heat exchanger body, and wherein each flow channel of the second flow circuit includes a respective inlet on the second end of the heat exchanger body and a respective outlet on the first end of the heat exchanger body.

3. The heat exchanger as recited in claim 1, wherein each flow channel includes a single respective inlet and a single respective outlet.

4. The heat exchanger as recited in claim 1, wherein the flow channels of the first flow circuit have cross-sections of a first shape, and wherein the flow channels of the second flow circuit have cross-sections of a second shape different from the first shape.

5. The heat exchangers as recited in claim 1, wherein each flow channel of the first flow circuit has a diamond or hexagonal cross-sectional shape, and wherein each flow channel of the second flow circuit has a circular cross-sectional shape.

6. The heat exchanger as recited in claim 1, wherein each adjacent pair of the flow channels is separated from one another by a heat exchanger wall, wherein the heat exchanger wall is constant in cross-section from the first end of the heat exchanger body to the second end of the heat exchanger body.

7. The heat exchanger as recited in claim 1, wherein the flow channels of the first flow circuit and the flow channels of the second flow circuit are arranged to define a two-dimensional cross-sectional checkerboard pattern with one another.

8. The heat exchanger as recited in claim 1, wherein the flow channels and heat exchanger body are additively manufactured as a unitary structure.

9. The heat exchanger as recited in claim 1, wherein the first and second directions are normal to one another.

* * * * *